United States Patent
Yang

(10) Patent No.: US 12,107,207 B2
(45) Date of Patent: Oct. 1, 2024

(54) FLEXIBLE BATTERY

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

(*) Notice: Subject to any disclaimer, the term of this patent is extended or adjusted under 35 U.S.C. 154(b) by 720 days.

(21) Appl. No.: 16/646,421

(22) PCT Filed: Aug. 15, 2018

(86) PCT No.: PCT/CN2018/100672
§ 371 (c)(1),
(2) Date: Mar. 11, 2020

(87) PCT Pub. No.: WO2019/062367
PCT Pub. Date: Apr. 4, 2019

(65) Prior Publication Data
US 2020/0280089 A1 Sep. 3, 2020

(30) Foreign Application Priority Data
Sep. 29, 2017 (CN) .......................... 201710908077.2

(51) Int. Cl.
*H01M 10/04* (2006.01)
*H01M 50/238* (2021.01)

(52) U.S. Cl.
CPC ...... *H01M 10/0436* (2013.01); *H01M 50/238* (2021.01)

(58) Field of Classification Search
CPC .......... H01M 10/0436; H01M 50/238
(Continued)

(56) References Cited

U.S. PATENT DOCUMENTS 5,939,223 A * 8/1999 Cotte .................... H01M 4/622
429/232
9,105,930 B2 8/2015 Yang
(Continued)

FOREIGN PATENT DOCUMENTS

CN 101682031 A 3/2010
CN 101874319 A 10/2010
(Continued)

OTHER PUBLICATIONS

Bigham, Focus on Polyimides, Resinate, No. 7, Jul. 2019, pp. 1-16 (Year: 2019).*
(Continued)

*Primary Examiner* — Jonathan G Jelsma
*Assistant Examiner* — Omar M Kekia
(74) *Attorney, Agent, or Firm* — RABIN & BERDO, P.C.

(57) ABSTRACT

A flexible battery is disclosed in the present invention. One of a first active material layer, an intermediate layer, a second active material layer, a first interface located between the first active material layer and the intermediate layer, and a second interface located between the second active material layer and the intermediate layer includes a first adhesive. The first adhesive includes at least one first linear polymer and at least one first crystallization inhibitor. Therefore, the active material layers, the intermediate layer or the interfaces have sufficient adhesion and flexibility. The electrochemical reaction element would not easy to be cracked or separated after bending, and the ionic and electrical conductivities of the battery is greatly improved.

19 Claims, 2 Drawing Sheets

(58) Field of Classification Search
USPC .................................................. 429/127
See application file for complete search history.

(56) References Cited

U.S. PATENT DOCUMENTS

| | | | |
|---|---|---|---|
| 9,570,728 B2 | 2/2017 | Yang | |
| 9,673,480 B2 | 6/2017 | Medlege et al. | |
| 10,862,127 B2* | 12/2020 | Komaba | H01M 4/625 |
| 2010/0129719 A1* | 5/2010 | Ito | H01M 4/587 |
| | | | 429/232 |
| 2010/0316903 A1 | 12/2010 | Kim et al. | |
| 2011/0217570 A1 | 9/2011 | Yang | |
| 2013/0130091 A1 | 5/2013 | Yang | |
| 2013/0260205 A1 | 10/2013 | Kwon et al. | |
| 2015/0004461 A1 | 1/2015 | Lin | |
| 2015/0017532 A1 | 1/2015 | Iguchi et al. | |
| 2015/0118551 A1* | 4/2015 | Oshima | H01M 4/366 |
| | | | 429/212 |
| 2015/0171462 A1 | 6/2015 | Hong et al. | |
| 2015/0207167 A1 | 7/2015 | Ueda et al. | |
| 2016/0056438 A1 | 2/2016 | Kim et al. | |
| 2016/0056494 A1 | 2/2016 | Otts et al. | |
| 2019/0315924 A1* | 10/2019 | Sugiyama | C08G 73/14 |
| 2019/0319243 A1* | 10/2019 | Yi | H01M 50/417 |

FOREIGN PATENT DOCUMENTS

| | | |
|---|---|---|
| CN | 201673947 U | 12/2010 |
| CN | 103247768 A | 8/2013 |
| CN | 104053687 A | 5/2016 |
| CN | 104662723 A | 4/2017 |
| JP | H07249408 A | 9/1995 |
| JP | H10172573 A | 6/1998 |
| JP | 2008-021586 A | 1/2008 |
| JP | 2009004250 A | 1/2009 |

OTHER PUBLICATIONS

Extended European Search Report issued May 11, 2021 in Application No. 18861677.5.

M. Krumova et al., Effect of crosslinking on the mechanical and thermal properties of poly(vinyl alcohol), Polymer 41 (2000), Apr. 6, 2020, pp. 9265-9272.

* cited by examiner

FLEXIBLE BATTERY

BACKGROUND OF THE INVENTION

Field of Invention

The present invention relates to a flexible battery, in particular to a flexible battery which the internal structure of the electrochemical reaction elements would not be cracked or separated after bending.

Related Art

Recently, various electronic devices are developed. To make such electronic devices more comply with the trend of lightweight and thin, space distributions within the electronis devices become an important issue. The flexible battery displaced in a non-plane may be one solution of the issue. However, the electrodes may be cracked during bending resulting in the decreasing of the ionic conductivity. And the performance of the battery would also be reduced.

With respect to the characteristics of the battery, the materials of the electrodes, the electrolyte and the separator are a key point to affect the ionic and electrical conductivities. The electrode includes an active material layer and a current collector. If a better adhesion is existed between the active material layer and the current collector, the distances of the electron and ion migration in the electrode can be effectively shortened. Meanwhile, the resistance in the electrode is reduced, and the electrochemical conversion efficiency is improved. More specifically, when the active material layer and the current collector are tightly bonded, the distances of the electron and ion migration are shortened. The resistances between each interfaces of the layers are reduced, and the coulombic efficiency is further improved. The battery capacity can still be maintained after being repeatedly charged and discharged. Moreover, the chosen binder in the active material layer would significantly affect the adhesion between the layers. And the content and distribution of the active materials in the active material layer could be directly determined. Along with the active material and the binder better connection relationship, the active materials in the active material layer have more desirable content and distribution, of course, can improve the capacity of the battery. Besides, the binder in the separator can provide adhesive forces of the separator and the active material layer. In particular separator structure, such as a ceramic separator, the selected binder may affect the properties of the separator, such as content of ceramic material, ability of electrolyte adsorption, ability of electrical isolation, and etc.

As aforementioned viewpoint, at present days, the flexible adhesives, such as Polyvinylidene fluoride (PVDF), poly (vinylidenefluoride-co-hexafluoropropylene) (PVDF-HFP) or styrene-butadiene rubber (SBR) are usually used in the lithium battery. These adhesives belong to a linear structure, which can provide well adhesion in X or Y axis directions. However, after heat or pressing treatments, the polymer chain of these adhesives would occur crystallization reaction due to the affecting of heats or pressure. In other words, the interfaces between the active material layers and the separators which adding these adhesives, will generate a large amount of crystals after heat or pressing treatments. Therefore, during bending of the battery, the ability of the adhesion for the active materials is reduced resulting from that the structure or the crystalline structure of the adhesive is damaged by the external force. The electrodes and the separators would be cracked, even the active material layers, the separators and the current collectors would be separated. In the end, both of the ionic and electrical conductivities are significantly decreased and the efficiency of charging and discharging are worse. On the other hand, if the adhesives, such as epoxy, acrylic acid glue or polyacrylonitrile (PAN) are completely used, the adhesion is very well. But the rigidity is too high and the flexible is not enough to meet the requirement of the bending for the battery.

In view of the above factors, the invention provides a flexible battery in order to overcome the aforementioned problems.

SUMMARY OF THE INVENTION

It is a primary objective of this invention to provide a flexible battery to avoid the electrochemical reaction elements being cracked or separated along with the crystal grain boundaries after bending of the flexible battery, and solve its derived problems of poor ionic and electrical conductivities.

In order to implement the abovementioned, this invention discloses a flexible battery. The battery includes a first substrate, a second substrate and a glue frame, wherein the glue frame is sandwiched between the first substrate and the second substrate in an orthographical direction. Therefore, the first substrate, the second substrate and the glue frame form an enclosed space for accommodating an electrochemical reaction element. The electrochemical reaction element includes a first active material layer, a second active material layer and an intermediate layer. The first active material layer is disposed adjacent to the first substrate and electrically connected to the first substrate. The second active material layer is disposed adjacent to the second substrate and electrically connected to the second substrate. The intermediate layer is sandwiched between the first active material layer and the second active material layer to provide electrical insulation for electrically isolating the first active material layer and the second active material layer. A first interface is located between the first active material layer and the intermediate layer. A second interface is located between the second active material layer and the intermediate layer. This invention is characterized in that one of the first active material layer, the second active material layer, the intermediate layer, the first interface and the second interface includes a first adhesive, and the first adhesive includes a first linear polymer and a first crystallization inhibitor, wherein the first adhesive contains 0.05 to 70 percent by weight of the first crystallization inhibitor.

Wherein the first crystallization inhibitor is selected from a polymer with a side chain, a first cross-linked polymer, or a nanoscale powder.

Wherein the first substrate and the second substrate are a positive current collector and a negative current collector.

Wherein the first active material layer is a positive active material layer and the second active material layer is a negative active material layer.

Wherein the intermediate layer is a separator.

Wherein the intermediate layer is an electrolyte layer.

Wherein the first linear polymer is selected from polyvinylidene fluoride (PVDF), poly(vinylidene fluoride-co-hexafluoropropylene) (PVDF-HFP), polytetrafluoroethylene (PTFE), acrylic acid glue, epoxy, polyethylene oxide (PEO), polyacrylonitrile (PAN), sodium carboxymethyl cellulose, styrene-butadiene rubber (SBR), polymethylacrylate, polyacrylamide, polyvinylpyrrolidone (PVP) and combinations thereof.

Wherein the first cross-linked polymer is selected from epoxy, acrylic acid resin, polyacrylonitrile (PAN) and combinations thereof with network-structure.

Wherein the first cross-linked polymer is a polyimide (PI) and derivatives thereof with ladder-structure.

Wherein when one of the first active material layer, the second active material layer, the intermediate layer, the first interface and the second interface includes the first adhesive, one of the remaining includes a second adhesive, wherein the second adhesive includes at least one second linear polymer and at least one second crystallization inhibitor, the second crystallization inhibitor is a second cross-linked polymer, and the first adhesive and the second adhesive are different.

Wherein the second linear polymer is selected from polyvinylidene fluoride (PVDF), poly(vinylidene fluoride-co-hexafluoropropylene) (PVDF-HFP), polytetrafluoroethylene (PTFE), acrylic acid glue, epoxy, polyethylene oxide (PEO), polyacrylonitrile (PAN), sodium carboxymethyl cellulose, styrene-butadiene rubber (SBR), polymethylacrylate, polyacrylamide, polyvinylpyrrolidone (PVP) and combinations thereof.

Wherein the second cross-linked polymer is selected from epoxy, acrylic acid resin, polyacrylonitrile (PAN) and combinations thereof with network-structure.

Wherein the second cross-linked polymer is a polyimide (PI) and derivatives thereof with ladder-structure.

Wherein the first linear polymer is the same as the second linear polymer.

Wherein the first cross-linked polymer is the same as the second cross-linked polymer.

Wherein the weight percent of the first cross-linked polymer in the first adhesive is different from the weight percent of the second cross-linked polymer in the second adhesive.

The advantages of this invention is to make the active material layers, the intermediate layer and the interfaces have sufficient adhesion and flexibility. Therefore, the electrochemical reaction element would not easy to be cracked or separated after bending, and the ionic and electrical conductivities of the battery is greatly improved.

REFERENCE NUMERALS

Figure 1:
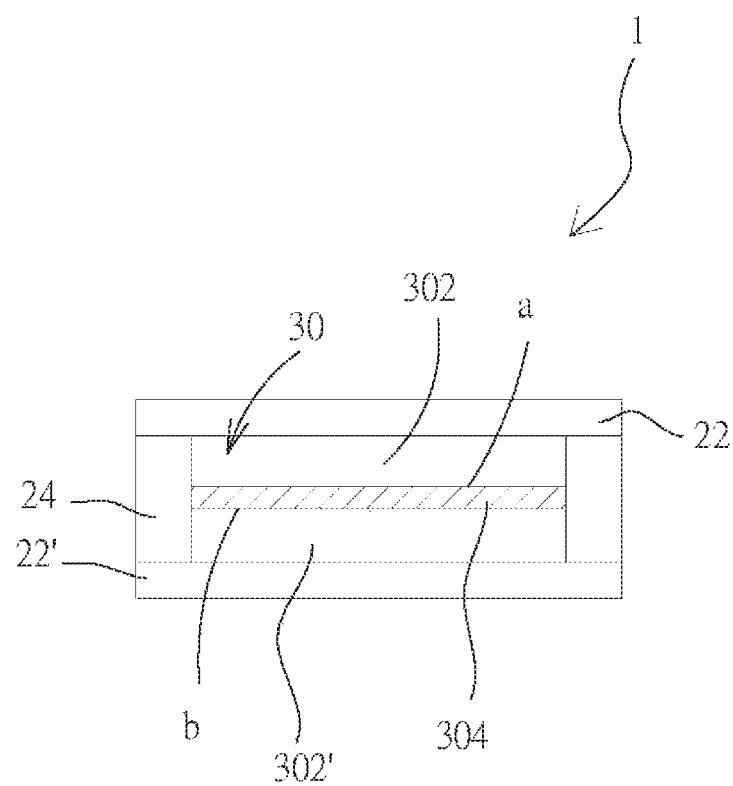
FIG. 1 is a schematic diagram of one embodiment of the flexible battery of this invention.

1 Flexible battery
22 First substrate
22' Second substrate
24 Glue frame
30 Electrochemical reaction element
302 First active material layer
302' Second active material layer
304 Intermediate layer
a First interface
b Second interface
LP Ladder-structure cross-linked polymer

DETAILED DESCRIPTION OF THE INVENTION

Please refer to FIG. 1, the flexible battery 1 includes a first substrate 22, a second substrate 22' and a glue frame 24, wherein the glue frame 24 is sandwiched between the first substrate 22 and the second substrate 22' in an orthographical direction. Therefore, the first substrate 22, the second substrate 22' and the glue frame 24 form an enclosed space. There has an electrochemical reaction element 30 in the enclosed space. The electrochemical reaction element 30 includes a first active material layer 302, a second active material layer 302' and an intermediate layer 304. The first active material layer 302 is disposed adjacent to the first substrate 22. The second active material layer 302' is disposed adjacent to the second substrate 22'. The intermediate layer 304 is sandwiched between the first active material layer 302 and the second active material layer 302' to provide electrical insulation for electrically isolating the first active material layer 302 and the second active material layer 302', which located at two sides of the intermediate layer 304. There have interfaces between the first active material layer 302, the second active material layer 302' and the intermediate layer 304. For example, a first interface a is located between the first active material layer 302 and the intermediate layer 304. A second interface b is located between the second active material layer 302' and the intermediate layer 304.

In this invention, one of the first active material layer 302, the intermediate layer 304, the second active material layer 302', the first interface a and the second interface b is added with a first adhesive. The first adhesive includes a first linear polymer and a first crystallization inhibitor, and the first adhesive contains 0.05 to 70 percent by weight of the first crystallization inhibitor.

The first crystallization inhibitor can be any additive capable of hindering the linear polymer to generate lattice orientation in it, such as a polymer with a side chain, a first cross-linked polymer, a nanoscale powder or the likes. Therefore, the first adhesive can provide good adhesion ability, and the main composition in the first adhesive, i.e. the first linear polymer, can maintain to be flexible. Moreover, the capacity of the bending strength of the electrochemical reaction element can be enhance. Therefore, the bending strength or the flexibility of the whole battery can also be increased.

The first linear polymer is made of a liner polymer with certain flexibility. The linear polymer is selected from polyvinylidene fluoride (PVDF), poly(vinylidene fluoride-co-hexafluoropropylene) (PVDF-HFP), polytetrafluoroethylene (PTFE), acrylic acid glue, epoxy, polyethylene oxide (PEO), polyacrylonitrile (PAN), sodium carboxymethyl cellulose, styrene-butadiene rubber (SBR), polymethylacrylate, polyacrylamide, polyvinylpyrrolidone (PVP) and combinations thereof.

The cross-linked polymer is then used as the first crystallization inhibitor as an example, but those who skilled in this art will recognize that the first crystallization inhibitor of the present invention can not be limited to only the cross-linked polymer.

When the first crystallization inhibitor is the cross-linked polymer. The first cross-linked polymer is made of the cross-linked polymer. The cross-linked polymer is selected from epoxy, acrylic acid resin, polyacrylonitrile (PAN) and combinations thereof with network-structure, or the ladder cross-linked polymer LP, such as polyimide (PI) and derivatives thereof with ladder-structure.

Without the presence of the crystallization inhibitor, when the heat treatment is performed to the flexible battery 1, the first linear polymer of the electrochemical reaction element would be crystallized due to its material properties. When the pressure treatment is also applied, the crystallization is more significant. Once the crystal size is too large or the degree of crystallization is too high, the formed crystals will become a steric hindrance in the structure. Therefore, the ion channels inside the flexible battery 1 are hindered, and the internal resistance of the battery is greatly increased. In addition, when the crystal size is too large or the degree of crystallization is too high, at the crystallization location, such as inside of the first active material layer 302, the second active material layer 302', or the intermediate layer 304, or the first interface a and the second interface b, it is easy to be cracked along the grain boundary when the flexible battery 1 is bent.

However, the characteristic of the good thermal stability and heat resistance of the first cross-linked polymer are utilized in this invention. When the heat treatment is preformed to the flexible battery 1, the first cross-linked polymer can bear high temperature without melting. The first cross-linked polymer has more steric side-chains compared with the first linear polymer. Under the high temperature process, or together with high pressure, the first cross-linked polymer is served as the hindrance to the crystallization of the first linear polymer. The crystal size or the degree of crystallization of the first linear polymer can be limited, and the steric hindrance caused by crystallization can be reduced to make the ions pass more smoothly Moreover, when one of the first active material layer 302, the second active material layer 302', the intermediate layer 304, the first interface a and the second interface b includes the first adhesive, one of the remaining includes a second adhesive. The second adhesive includes at least one second linear polymer and at least one second crystallization inhibitor, and the first adhesive and the second adhesive are different. For the difference, the first linear polymer and the second linear polymer may be the same, but the first crystallization inhibitor and the second crystallization inhibitor are different, or each different in weight percent within itself. Also, the first linear polymer and the second linear polymer may be different, but the first crystallization inhibitor and the second crystallization inhibitor are the same.

The compositions of the second linear polymer and the second crystallization inhibitor may be the same as the compositions of the first linear polymer and the first crystallization inhibitor of the first adhesive, and are not repeated here.

For example, the first active material layer 302 has the first adhesive, and the intermediate layer 304 has the second adhesive. The second adhesive consists of the second linear polymer and the second crystallization inhibitor, and the second crystallization inhibitor accounts for no less than 50% by weight of the second adhesive. The first linear polymer may be the same or different as the second linear polymer, that is, the first linear polymer may be composed of the same linear polymer as the second linear polymer, and likewise, the first crystallization inhibitor and the second crystallization inhibitor may be the same or different.

Also, the crystallization inhibitor with a side chain will have a better adhesion in Z-axis direction. For example, when the first interface a contains the first adhesive and the first crystallization inhibitor is a first cross-linked polymer, the first cross-linked polymer adhere the first active material layer 302 to the intermediate layer 304 firmly in the Z-axis direction, such that a good electrical conductivity is maintained between the first active material layer 302 and the intermediate layer 304.

Figure 2A:
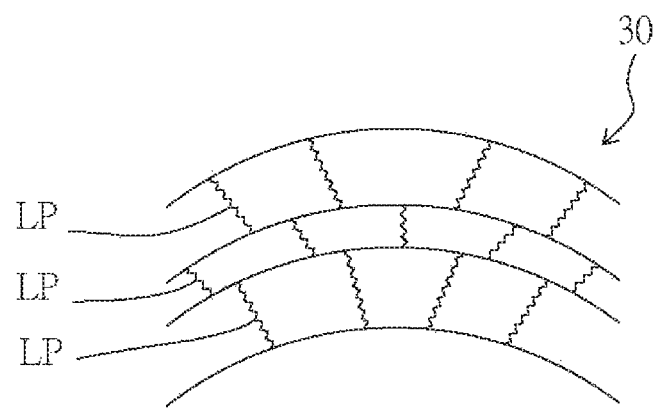
FIGS. 2A and 2B are partial enlarged views of the flexible battery of this invention during bending and restoring.
Figure 2B:
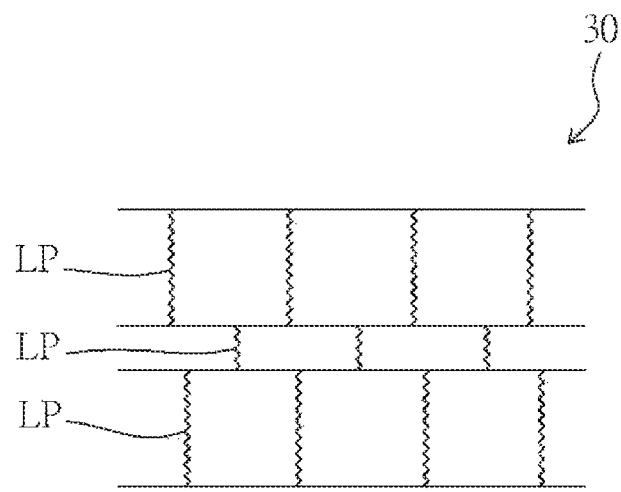

Furthermore, the first cross-linked polymer and/or second cross-linked polymer may be a ladder-structure polymer, such as polyimide (PI) and derivatives thereof. This type of the cross-linked polymer has higher elasticity than the above-mentioned cross-linked polymer with network structure. Therefore, as shown in FIG. 2A and FIG. 2B, the electrochemical reaction element 30 can extend in the Z-axis direction without crack due to the bending stress is absorbed by the ladder-structure cross-linked polymer LP during bending of the external force. The ladder-structure cross-linked polymer LP can be restored to the original state after the external force borne by the electrochemical reaction element 30 is removed. Therefore, the purpose of repeatedly bending without damaging the electrochemical reaction element 30 is achieved.

The first substrate 22 and the second substrate 22' described above may be a positive current collector or a negative current collector. For example, when the first substrate 22 is the positive current collector, the second substrate 22' is the negative current collector, and vice versa. The first active material layer 302 and the second active material layer 302' may be a positive active material layer or a negative active material layer. For example, when the first active material layer 302 is the positive active material layer, the second active material layer 302' is the negative active material layer, and vice versa.

In addition, the intermediate layer 304 is a separator or an electrolyte layer of the battery. Therefore, the intermediate layer 304 has certain ionic conductivity and electrical insulation properties, and also has flexibility due to the flexible characteristics of the battery. In addition to the second linear polymer, the second cross-linked polymer accounts for no less than 50% by weight of the second adhesive. When the network-structure cross-linked polymer, such as epoxy, acrylic acid resin, or polyacrylonitrile (PAN) is utilized, the formed cross-linked structure is a network, and the overall structure is compact. The second linear polymer with linear structure is added to decrease the chance presence of a large through-hole, and enhance the electrical insulation properties. Besides, when PI with the ladder cross-linked structure is used, the holes distribution formed by ladder cross-linked structure would make the ions pass easier. Meanwhile, the ladder-structure cross-linked polymer LP has the electrically insulating property. The second adhesive is composed of the appropriate ratio of the above cross-linked polymer and the linear polymer to add into the intermediate layer 304, so that a better balance between the ion conduction and the electrical insulation in the intermediate layer 304 are achieved.

Linear polymers can be used to promote adhesion on the X-Y plane. The first cross-linked polymer and the second cross-linked polymer are composed of the cross-linked polymer. The cross-linked polymer can be used to improve the adhesion and ion conduction capability in the Z-axis direction. And, the probability or degree of the polymer crystallization generated after heat treatment or pressure treatment among the layers is disturbed or reduced. The adhesion of this invention refers to the ability of inter-layer (eg, between the substrate and the active material layer, between the active material layer and the separator) to adhere to one another, the ability of the material within layers (eg, within the active material layer or within the separator) to adhere to one another.

Furthermore, in the present invention, one of the first active material layer 302, the second active material layer 302', the intermediate layer 304, the first interface a and the second interface b includes the first adhesive, one of the remaining includes the second adhesive. By adjusting the ratio between the linear polymer and the cross-linked polymer in the first adhesive and/or the second adhesive, the active material layer and the intermediate layer 304 in the electrochemical reaction element 30 can still be flexible after treating by heat or pressure and can be carried out bending many times And the crack along the grain boundary caused by the crystals generating is avoided.

Also, because the adhesive system with the crystallization inhibitor can make the layers have good adhesion and flexibility after heat treatment or pressure treatment, the flexible battery of the invention will not be easily separated from the intermediate layer 304 when the flexible battery is bent. So that a better balance is achieved among the ions, the electrical conduction and the insulation property, and then the electrical performance of the flexible battery 1 is improved.

All of the structures, the materials and the processes disclosed herein are suitable for use in a variety of battery systems such as, for example, liquid batteries, gel batteries, solid state batteries, liquid/gel hybrid batteries, liquid/solid state hybrid batteries or gel/solid state hybrid batteries, or so-called flexible lithium batteries, flexible lithium ion batteries, flexible lithium polymer batteries, flexible lithium metal batteries, flexible lithium ceramic batteries, or flexible lithium metal ceramic batteries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flexible battery, comprising:
a first substrate;
a second substrate;
a glue frame, being sandwiched between the first substrate and the second substrate in an orthographical direction to form an enclosed space;
an electrochemical reaction element, disposed in the enclosed space and the electrochemical reaction element including:
a first active material layer, disposed adjacent to the first substrate and electrically connected to the first substrate;
a second active material layer, disposed adjacent to the second substrate and electrically connected to the second substrate;
an intermediate layer, being sandwiched between the first active material layer and the second active material layer for electrically isolating the first active material layer and the second active material layer;
a first interface, located between the first active material layer and the intermediate layer; and
a second interface, located between the second active material layer and the intermediate layer;
characterized in that:
one of the first interface and the second interface includes a first adhesive, which is an additional adhesive for reinforcement, and the first adhesive includes at least one first linear polymer and at least one first crystallization inhibitor, wherein the first adhesive contains 0.05 to 70 percent by weight of the first crystallization inhibitor,
one of the first active material layer and the second active material layer includes at least one second adhesive different from the first adhesive, and wherein the second adhesive includes at least one second linear polymer and at least one second crystallization inhibitor.

2. The flexible battery of claim 1, wherein the first crystallization inhibitor is selected from a polymer with a side chain, a first cross-linked polymer, or a nanoscale powder.

3. The flexible battery of claim 2, wherein the first cross-linked polymer is selected from epoxy, acrylic acid resin, polyacrylonitrile (PAN) and combinations thereof with network-structure.

4. The flexible battery of claim 2, wherein the first cross-linked polymer is a polyimide (PI) and derivatives thereof with ladder-structure.

5. The flexible battery of claim 1, wherein the first substrate and the second substrate are a positive current collector and a negative current collector.

6. The flexible battery of claim 1, wherein the first active material layer is a positive active material layer and the second active material layer is a negative active material layer.

7. The flexible battery of claim 1, wherein the intermediate layer is a separator.

8. The flexible battery of claim 1, wherein the intermediate layer is an electrolyte layer.

9. The flexible battery of claim 1, wherein the first linear polymer is selected from polyvinylidene fluoride (PVDF), poly(vinylidene fluoride-co-hexafluoropropylene) (PVDF-HFP), polytetrafluoroethylene (PTFE), acrylic acid glue, epoxy, polyethylene oxide (PEO), polyacrylonitrile (PAN), sodium carboxymethyl cellulose, styrene-butadiene rubber (SBR), polymethylacrylate, polyacrylamide, polyvinylpyrrolidone (PVP) and combinations thereof.

10. The flexible battery of claim 1, the second crystallization inhibitor is a second cross-linked polymer.

11. The flexible battery of claim 10, wherein the second cross-linked polymer is selected from epoxy, acrylic acid resin, polyacrylonitrile (PAN) and combinations thereof with network-structure.

12. The flexible battery of claim 10, wherein the second cross-linked polymer is a polyimide (PI) and derivatives thereof with ladder-structure.

13. The flexible battery of claim 10, wherein the first cross-linked polymer is the same as the second cross-linked polymer.

14. The flexible battery of claim 10, wherein the weight percent of the first cross-linked polymer in the first adhesive is different from the weight percent of the second cross-linked polymer in the second adhesive.

15. The flexible battery of claim 10, wherein the first linear polymer is different from the second linear polymer.

16. The flexible battery of claim 10, wherein the first crystallization inhibitor is different from the second crystallization inhibitor.

17. The flexible battery of claim 1, wherein the second linear polymer is selected from polyvinylidene fluoride (PVDF), poly(vinylidene fluoride-co-hexafluoropropylene) (PVDF-HFP), polytetrafluoroethylene (PTFE), acrylic acid glue, epoxy, polyethylene oxide (PEO), polyacrylonitrile (PAN), sodium carboxymethyl cellulose, styrene-butadiene rubber (SBR), polymethylacrylate, polyacrylamide, polyvinylpyrrolidone (PVP) and combinations thereof.

18. The flexible battery of claim 1, wherein the first linear polymer is the same as the second linear polymer.

19. The flexible battery of claim 1, wherein the first adhesive bonds with layers or materials that contact the first adhesive, and the second adhesive bonds with layers or materials that contact the second adhesive.

* * * * *